United States Patent
Samukawa et al.

(10) Patent No.: US 6,882,303 B2
(45) Date of Patent: Apr. 19, 2005

(54) OBSTACLE DETECTION SYSTEM FOR AUTOMOTIVE VEHICLE

(75) Inventors: Yoshie Samukawa, Kariya (JP); Toyohito Nozawa, Kariya (JP); Hiroshi Ohkata, Kariya (JP); Tsutomu Natsume, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/716,549

(22) Filed: Nov. 20, 2003

(65) Prior Publication Data

US 2004/0119634 A1 Jun. 24, 2004

(30) Foreign Application Priority Data

Dec. 19, 2002 (JP) ........................................ 2002-368902

(51) Int. Cl.$^7$ ........................... G01S 13/93; G01S 17/93
(52) U.S. Cl. ..................... 342/70; 342/146; 701/301; 340/435
(58) Field of Search .............................. 342/70, 71, 72, 342/107, 108, 109, 146; 701/301; 340/435, 436, 903

(56) References Cited

U.S. PATENT DOCUMENTS

| | | | |
|---|---|---|---|
| 6,249,243 B1 | * | 6/2001 | Takagi ........................ 342/70 |
| 6,518,916 B1 | * | 2/2003 | Ashihara et al. .............. 342/70 |
| 6,593,873 B1 | | 7/2003 | Samukawa et al. |

FOREIGN PATENT DOCUMENTS

JP      A-2002-40139      2/2002

* cited by examiner

*Primary Examiner*—Ian J. Lobo
(74) *Attorney, Agent, or Firm*—Posz Law Group, PLC

(57) ABSTRACT

An obstacle detection system includes a laser radar sensor that emits laser beams for scanning a two-dimensional detection area ahead of a vehicle and receives reflected beams in a form of reflecting dots representing the obstacle such as a preceding vehicle. To effectively detect a preceding vehicle traveling on a curved road, a reference angular direction in which the preceding vehicle is most probably located is set based on a traveling speed of the own vehicle and a calculated radius of the curved road. The reflecting dots are selected from those located closer to the reference angular direction until they reach a predetermined number, thereby forming a target model. The preceding vehicle is detected based on the target model.

9 Claims, 6 Drawing Sheets

(PRESEGMENT)

(MAIN SEGMENT)

OBSTACLE DETECTION SYSTEM FOR AUTOMOTIVE VEHICLE

CROSS-REFERENCE TO RELATED APPLICATION

This application is based upon and claims benefit of priority of Japanese Patent Application No. 2002-368902 filed on Dec. 19, 2002, the content of which is incorporated herein by reference.

BACKGROUND OF THE INVENTION

1. Field of the Invention

The present invention relates to a system mounted on an automotive vehicle for detecting an obstacle such as a preceding vehicle by emitting radar beams and receiving beams reflected by the obstacle.

2. Description of Related Art

An example of an obstacle detecting system mounted on an automotive vehicle is shown in JP-A-2002-40137. In this system, radar beams such as light beams or millimeter-wave beams are emitted toward an obstacle such as a preceding vehicle, and beams reflected by the obstacle are received. Based on the reflected beams received by the system, a distance from the vehicle carrying the system to the preceding vehicle is detected. For example, if the distance between two vehicles becomes too short, a warning is given to a driver of the vehicle carrying the system, or the distance between two vehicles are maintained not to become shorter than a predetermine distance by controlling a traveling speed of the vehicle.

Laser beams are emitted while scanning in both the horizontal and vertical directions, thereby detecting an obstacle such as a preceding vehicle located in a predetermined scanning area. The distance to the preceding vehicle and its angular direction relative to a direction in which the vehicle carrying the system is traveling are detected based on the laser beams reflected by the preceding vehicle. In other words, the preceding vehicle is detected as plural dots reflecting the laser beams. The horizontal width and the vertical height of the obstacle such as a preceding vehicle are detected based on the horizontal angle of reflected beams and the vertical angle of the reflected beams, respectively.

More particularly, after one scan in the horizontal direction is completed, the vertical angle of the beam is changed by a certain angle and the next horizontal scan is carried out. This process is repeated until all the scanning area is covered. After one horizontal scan is completed, the plural dots reflecting the laser beams, which fall within a certain distance range from the vehicle carrying the obstacle-detecting system and within a certain width range in the horizontal direction, are grouped into presegment data. Further, the presegment data obtained by scanning each horizontal scanning line, which are close to one another, are grouped into main segment data. The presegment data and the main segment data include only a limited number of the reflecting dots detected in the scanned area to save a memory capacity in a RAM and to shorten data processing time.

When the vehicle is traveling on a curved road, a preceding vehicle is not detected in the center of the horizontal scanning range, but it will be detected at a fringe of the horizontal scanning range. To cope with this situation, a reference angular direction from which the grouping operation to form the presegment data is initiated is calculated based on a radius of the curved road. The reference angular direction extends to a point on the curved road where the preceding vehicle is most probably located. Thus, the presegment data are formed from the reflecting dots located close to the reference angular direction.

In the system disclosed in JP-A-2002-40137, the reference angular direction is calculated based on only the radius of the curved road. It is difficult, however, to assume the position on the curved road where the preceding vehicle is most probably located based on only the radius of the curved road. When the preceding vehicle is traveling on the curved road having a given radius, it will be most probably detected at a position closer to the fringe of the scanning angular range if the distance between two vehicles is large. On the contrary, if the distance is not large, the preceding vehicle will be detected at a position closer to the center of the scanning range even when the preceding vehicle is traveling on the curved road having the same radius. The distance between the vehicles is also important to correctly assume the position of the preceding vehicle in addition to the radius of the road. Therefore, it has been a problem in the system disclosed in JP-A-2002-40137 that the presegment data representing the preceding vehicle cannot be satisfactorily formed.

SUMMARY OF THE INVENTION

The present invention has been made in view of the above-mentioned problem, and an object of the present invention is to provide an improved obstacle detection system which is able to detect a preceding vehicle more surely even when the preceding vehicle is traveling on a curved road.

The obstacle detection system mounted on an automotive vehicle according to the present invention includes a radar sensor such as a laser radar sensor and an electronic control unit for processing the data sensed by the radar sensor. Radar beams such as laser beams are emitted ahead of the vehicle on which the obstacle detection system is mounted. A predetermined two dimensional area ahead of the vehicle is scanned by the radar beams, and the reflected beams are returned to the sensor from the frontal obstacle such as a preceding vehicle. The obstacle is detected as plural reflecting dots. The electronic control unit processes the reflecting dots, and thereby the position of the obstacle is detected.

To detect the preceding vehicle even when the preceding vehicle is traveling on a curved road, a reference distance is set according to the driving speed of the own vehicle on which the system is mounted. The reference distance is set longer as the vehicle speed becomes higher. Also, a radius of the curved road is calculated based on the various data sensed by the sensors mounted on the vehicle. A point apart from the own vehicle by the reference distance is set on the curved road having the calculated radius. A reference angular direction is set on a line connecting the point set on the curved road and the own vehicle. It is most probable that the preceding vehicle is found in the reference angular direction.

The reflecting dots located close to the reference angular direction are searched and grouped into a target model. Since the number of reflecting dots to be grouped is limited in order to save a memory capacity and to shorten a processing time, it is effective to search around the reference angular line where the preceding vehicle is most probably located. If the preceding vehicle is continuously observed for a predetermined period and if the calculated radius of the curved road is smaller than a predetermined value (i.e., if it is presumed that the road is not straight), the reference angular direction is set on a line connecting the observed preceding vehicle and the own vehicle.

The reflecting dots for forming the target model may be selected sequentially from those located closer to the reference angular direction until the number of selected reflecting dots reaches the predetermined number. Alternatively, one reflecting dot may be selected from one side of the reference angular direction and the next reflecting dot from the other side. This process may be repeated until the number of the reflecting dots selected reaches the predetermined number.

According to the present invention, the preceding vehicle can be surely detected even when it is traveling on a curved road. Other objects and features of the present invention will become more readily apparent from a better understanding of the preferred embodiment described below with reference to the following drawings.

DETAILED DESCRIPTION OF THE PREFERRED EMBODIMENT

Figure 1:
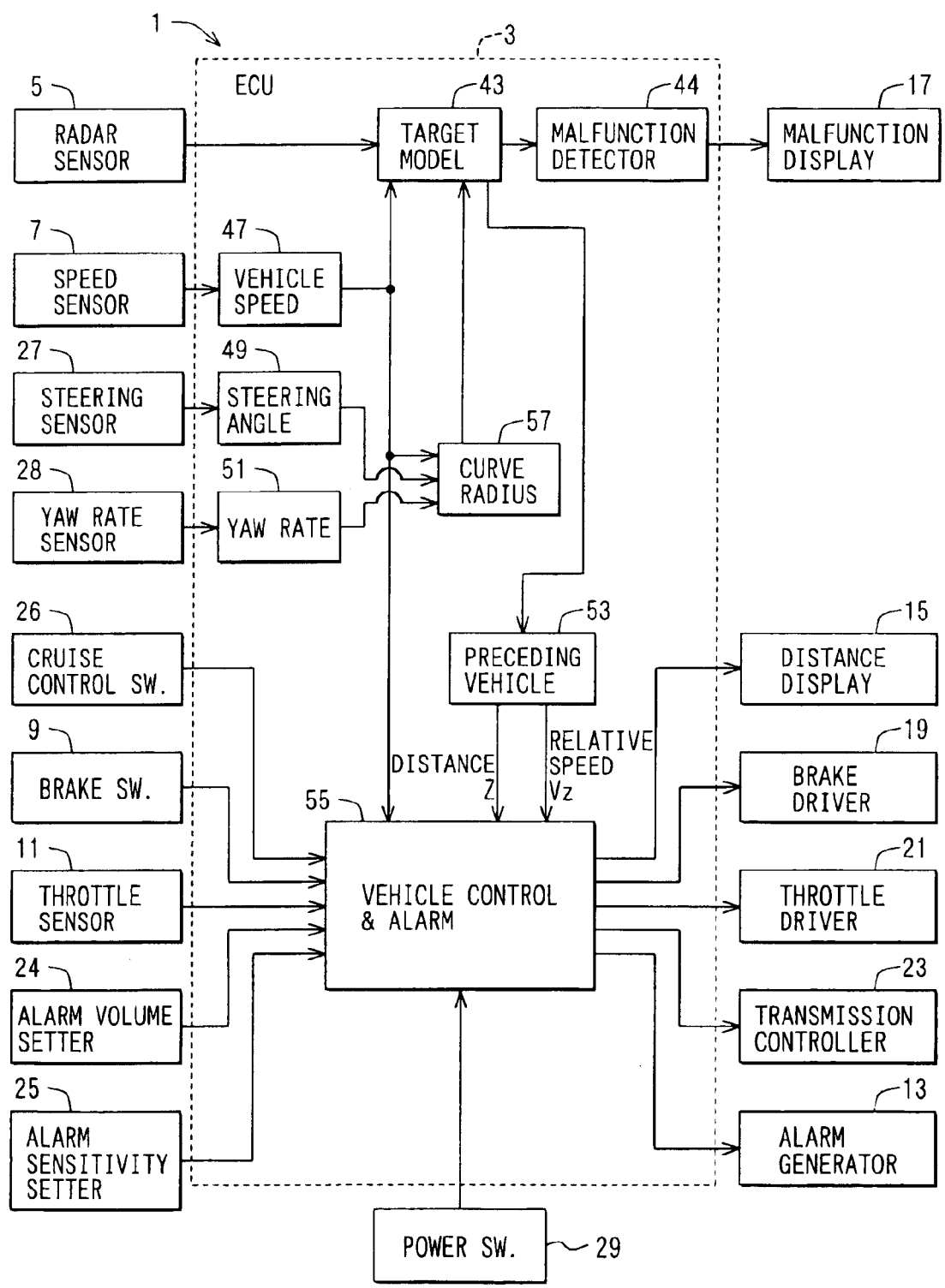
FIG. 1 is a block diagram showing a vehicle control system including an obstacle detection system according to the present invention.

A preferred embodiment of the present invention will be described with reference to the accompanying drawings. FIG. 1 shows a vehicle control system that includes an obstacle detection system according to the present invention. The vehicle control system 1 is mounted on an automotive vehicle and includes an ECU (electronic control unit) 3 and various input/output interfaces. Since these hardwares included in the vehicle control system 1 are known ones, their explanations in detail are not made here.

Signals from a laser radar sensor 5, a vehicle speed sensor 7, a brake switch 9, and a throttle sensor 11 are fed to the ECU 3. Signals for driving an alarm generator 13, a distance display 15, a malfunction display 17, a brake driver 19, a throttle driver 21 and an automatic transmission controller 23 are supplied to these devices. An alarm volume setter 24, an alarm sensitivity setter 25 that sets a sensitivity level in a process of alarm generation, a cruise control switch 26, a steering sensor 27 that detects an amount of steering, and a yaw rate sensor 28 that detects a yaw rate generated in the vehicle are also connected to the ECU 3. Operation of the ECU 3 is initiated by turning on a power switch 29.

Figure 2A:
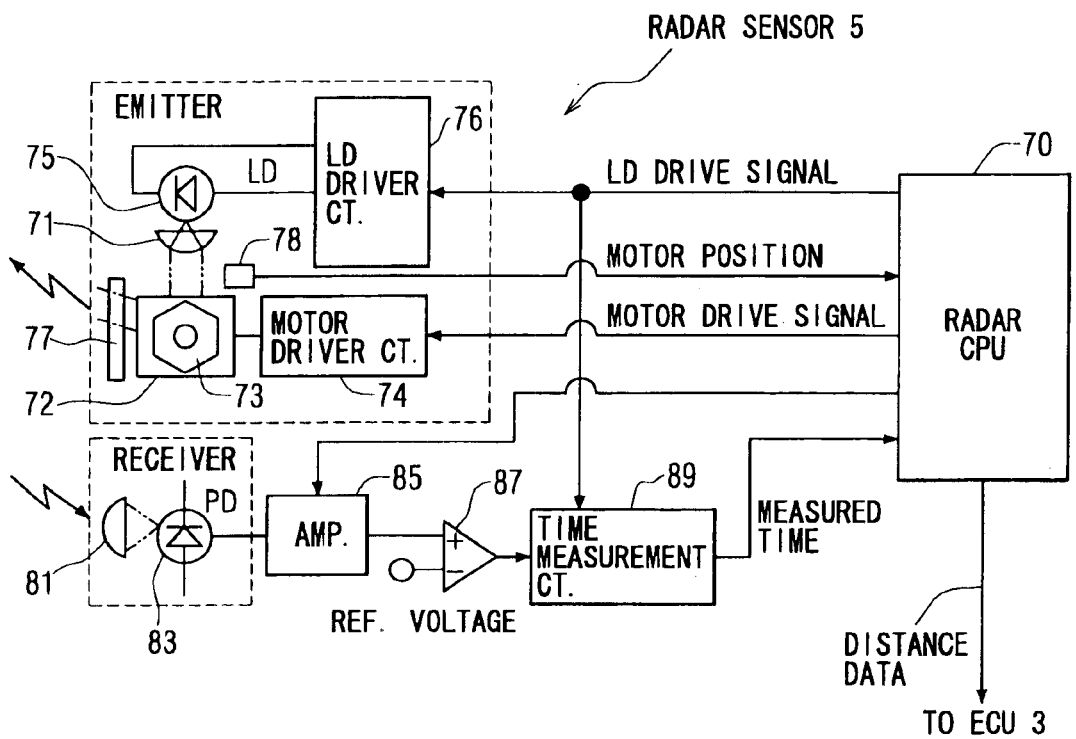
FIG. 2A is a block diagram showing a laser radar sensor used in the obstacle detection system.

The laser radar sensor 5 is shown in FIG. 2A in detail. The laser radar sensor 5 is composed of an emitter, receiver, a radar CPU 70 and other associated components. The emitter includes a semiconductor laser diode 75 that emits laser pulses through an emitting lens 71, a scanner 72 and a glass plate 77. The laser diode 75 connected to the laser radar CPU 70 through a laser diode driving circuit 76 is driven by a driving signal supplied from the laser radar CPU 70. The scanner 72 includes a polygon mirror 73 that rotates around a vertical axis when a driving signal is fed from the laser radar CPU 70 through a motor driver circuit 74. Rotational positions of a motor (not shown) for driving the polygon mirror 73 are detected by a motor position sensor 78 and are fed to the laser radar CPU 70.

Figure 3:
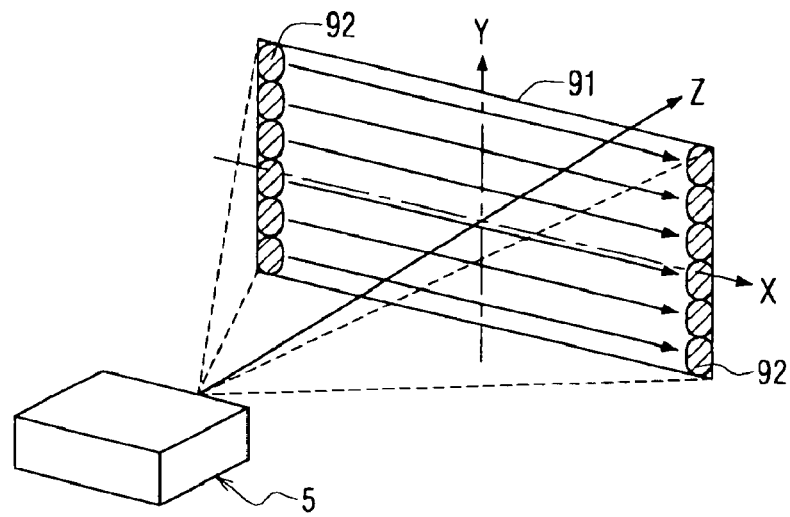
FIG. 3 is a perspective view showing a detection area scanned by the laser radar beams.

Since the polygon mirror 73 has six mirrors, each having respectively different slant angles relative to the vertical direction, the laser beams can be scanned in the horizontal and the vertical directions. The laser beams are emitted in a form of discrete pulses. An area scanned by the laser beams (an detection area 91) is shown in FIG. 3. A Z-axis is set to the traveling direction of the vehicle on which the laser radar sensor 5 is mounted. An X-Y plane perpendicular to the Z-axis is the plane to be scanned. The X-axis extends in the horizontal direction, or the direction in parallel to the width of the vehicle. The Y-axis extends in the vertical direction, or the direction in parallel to the height of the vehicle.

As shown in FIG. 3, the first scanning line is set at the top portion of the detection area 91, and the scanning is performed from the left to the right in the X-axis direction. After the scanning along the first scanning line is completed, the scanning moves to the second scanning line. This process is repeated until the scanning reaches to the bottom scanning line. In this particular embodiment, a scanning angular range in the X-direction is 15.75° (0.15°×105 dots), and a scanning range in the Y-direction is 4.2° (0.7°×6 lines). Namely, the laser beam in a pulse form is discretely emitted to 105 points on each scanning line in the X-direction, and the laser beam is shifted in the Y-direction until 6 scanning lines are all scanned. Thus, 630 (105×6) discrete laser beams are emitted to scan the entire detection area 91. In other words, 630 data are obtained by scanning the entire detection area.

A pattern 92 of the laser beam is oval in this embodiment, as shown in FIG. 3. However, the laser beam pattern 92 is not limited to the oval shape, but it may be a round shape or other shapes. The beam is not limited to the laser beam, but other beams such as a millimeter electromagnetic wave or an ultrasonic wave may be used.

By scanning the two-dimensional detection area 91 and receiving reflections from a target object, a distance between the laser radar sensor 5 and the target object in the Z-direction is obtained based on a period of time between a time emitting the beam and a time receiving its reflection. Also, a horizontal scan angle $\theta_x$ and a vertical scan angle $\theta_y$ are obtained. The horizontal scan angle $\theta_x$ is defined as an angle between the Z-axis and an emitted beam line projected on the X-Z plane. The vertical scan angle $\theta_y$ is defined as an angle between the Z-axis and an emitted beam line projected on the Y-Z plane.

Referring to FIG. 2 again, processing of the reflected beams will be described. The laser beam reflected by an obstacle (or a target object) is received by a receiving lens 81 in the receiver and is fed to a receiving element 83. The receiving element 83 outputs a voltage proportional to the received reflection. The output of the receiving element 83 is fed to an amplifier 85, and then to a comparator 87 that compares the output voltage from the amplifier 85 with a reference voltage. If the output voltage is higher than the reference voltage, a predetermined signal is sent to a time measurement circuit 89.

Figure 2B:
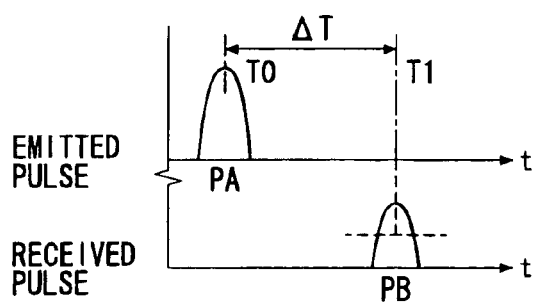
FIG. 2B is a graph showing an emitted laser pulse and a reflected laser pulse.

The laser diode driving signal from the laser radar CPU is also fed to the time measurement circuit 89. As shown in FIG. 2B, a pulse PA emitted at time T0 is reflected by the obstacle and a reflected pulse PB is returned at time T1. The time measurement circuit 89 calculates a time difference $\Delta T$ between time T1 and time T0 and converts the calculated time difference $\Delta T$ to a binary digital signal. The laser radar CPU 70 calculates a distance r from the detection system (the vehicle on which the detection system is mounted) to the obstacle based on the time difference $\Delta T$. The laser radar CPU 70 formulates position data (X,Y,Z) in the three-dimensional orthogonal coordinate having its origin (0,0,0) at the position of the laser radar sensor 5, based on the distance r, the horizontal scan angle $\theta_x$ and the vertical scan angle $\theta_y$. The calculated position data (X,Y,Z) are fed to the ECU 3 (shown in FIG. 1).

The ECU 3 detects and recognizes the obstacle based on the position data (X,Y,Z) and operates various driving devices and alarms according to the situations of the detected obstacle. Namely, the distance from the vehicle to the obstacle is controlled by operating a brake driver 19, a throttle driver 21, and an automatic transmission controller 23 in a controlled manner. If necessary, the ECU 3 outputs signals to operate alarming devices.

Referring to FIG. 1, operation of the ECU 3 will be described. The position data (X,Y,Z) outputted from the laser radar sensor 5 are fed to a block 43 for formulating a target model. The target model formulating block 43 performs grouping operation to obtain presegment data and main segment data. Each obstacle located in front of the vehicle is represented by the main segment data. The grouping operation will be explained later in detail. Based on the main segment data obtained for each obstacle, a center position (X,Y,Z) of the obstacle and a size of the obstacle (W,D,H) are calculated. W is the width of the obstacle in the X-direction, D is the depth in the Z-direction and H is the height in the Y-direction. Further, a speed (Vx,Vy,Vz) of the obstacle relative to the vehicle is calculated based on changes in the center position (X,Y,Z,).

Further, the target model formulating block 43 determines whether the obstacle is a stationary obstacle or a moving obstacle such as a preceding vehicle, based on the vehicle speed fed form the vehicle speed calculating circuit 47 and the calculated relative speed (Vx,Vy,Vz). The data constituted by the center position (X,Y,Z), the size (W,D,H) and the relative speed (Vx,Vy,Vz) are referred to as a "target model."

A malfunction detector 44 determines whether or not the target model formulated in the block 43 includes any abnormal data. If abnormal data are included, such is displayed on a malfunction display 17. The steering angle calculating circuit 49 calculates a steering angle based on a signal fed from the steering sensor 27. The yaw rate calculating circuit 51 calculates a yaw rate of the vehicle based on a signal fed from the yaw rate sensor 28. A curve radius calculating circuit 57 calculates a radius R of a curved road based on the vehicle speed fed from the circuit 47 and the yaw rate fed from the circuit 51. The curve radius R outputted from the curve radius calculating circuit 57 and the vehicle speed outputted from the vehicle speed calculating circuit 47 are used in the target model formulating block 43 for determining a point to initiate the grouping operation. This will be explained later in detail. Further, the target model formulating block 43 calculates a vehicle probability (a probability in that the detected obstacle is a preceding vehicle) and a same lane probability (a probability in that the preceding vehicle is on the same lane as the own vehicle), based on the data included in the target model.

A preceding vehicle detecting block 53 receives data regarding the obstacle (including the vehicle probability and the same lane probability) from the target model formulating block 43 and selects a preceding vehicle that is closest to the vehicle carrying the obstacle detection system. Also, a distance Z between two vehicles in the Z-direction and a relative speed Vz in the Z-direction are calculated. A vehicle control and alarm block 55 operates an alarm generator 13 if it is determined that such is necessary based on the various data including the distance Z, the relative speed Vz, a setting status of a cruise control switch 26, a condition of a brake switch 9, an opening degree of a throttle fed from a throttle sensor 11. If it is determined that a cruise control of the vehicle is to be performed, the vehicle control and alarm block 55 operates, in a controlled manner, the automatic transmission controller 23, the brake driver 19, and the throttle driver 21. The status of the various controls is displayed on the distance display 15.

It is important to correctly detect the obstacle such as a preceding vehicle in order to suitably perform the vehicle controls and the alarming operations described above. The target model formulating block 43 formulates the target model for correctly detecting the obstacle in the manner described below.

Figure 4A:
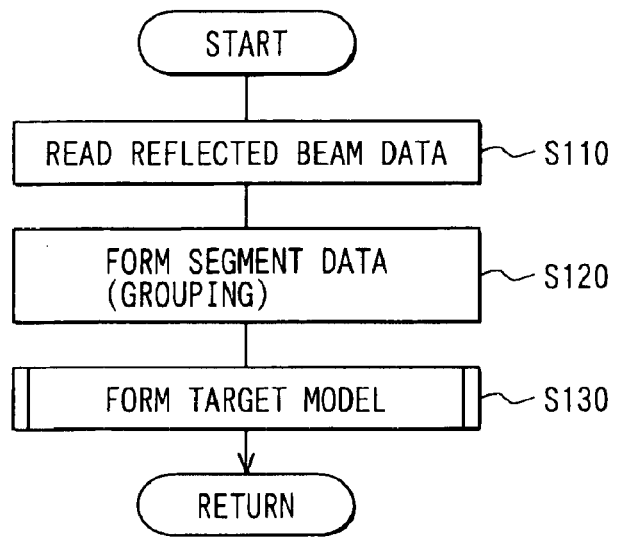
FIG. 4A is a flowchart showing a process of detecting an obstacle.

FIG. 4A shows a main process of detecting the obstacle. At step S110, data regarding the reflected beams fed from the laser radar sensor 5 are read for each scanning line. The scan period is 100 ms, i.e., all the position data covering the entire detection area 91 are read every 100 ms. At step S120, a segmentation process in which the position data are grouped into the segment data is performed. The segmentation process includes a process of forming the presegment data and a process of forming the main segment data.

Figure 5A:
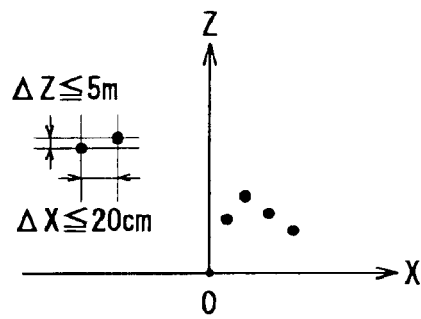
FIGS. 5A and 5B are graphs for explaining a process of forming presegment data.

In the process of forming the presegment data, the position data that satisfy a predetermined grouping conditions are selected from among all the position data shown in the X-Y-Z coordinate for each scanning line. The selected position data form the presegment data for each scanning line. Position data plotted on the X-Z plane are shown in FIG. 5A as examples. Position data in the Y-direction are not shown because they are uniquely determined by the scanning angle (0.7° for each scanning line). The grouping conditions consist of two conditions: one condition is that a distance $\Delta X$ between two neighboring dots in the X-direction does not exceed 20 cm ($\Delta X \leq 20$ cm); and the other condition is that a distance $\Delta Z$ between two neighboring dots in the Z-direction does not exceed 5 m ($\Delta Z \leq 5$ m). The position data satisfying the grouping conditions are grouped into one presegment data for each scanning line.

Figure 5B:
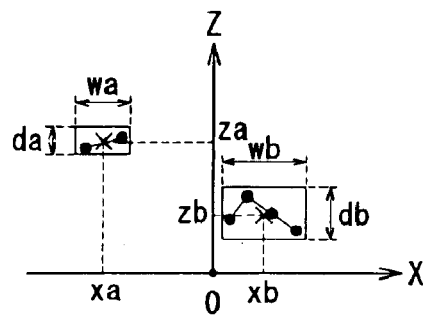

In FIG. 5B, one presegment data having a width wa in the X-direction and a depth da in the Z-direction, and the other presegment data having a width wb and a depth db are shown. The size of the presegment data (width×depth) is set to such a size that encompasses therein all the position data satisfying the grouping conditions. Each segment data consists of its center position (X,Z) and its size (W,D). One segment data exemplified in FIG. 5B has its center position (xa, za) and its size (wa, da). The other presegment data has its center position (xb, zb) and its size (wb, db).

In the process of forming the presegment data, the process is initiated at a center (X, Z) of a preceding vehicle when the preceding vehicle traveling on a curved road is continuously detected. When the preceding vehicle is not continuously detected, the process is initiated at a reference angular direction P which is determined from the radius R of the curved road and the vehicle speed. A particular beam number corresponding to the reference angular direction is referred to as an objective beam number at which the segmentation process is initiated.

Figure 6:
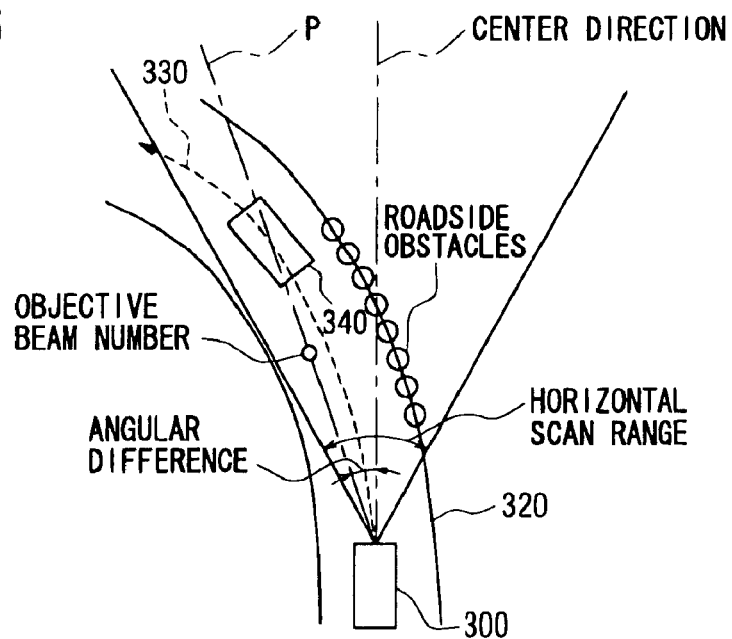
FIG. 6 is a schematic view showing a reference angular direction set on a curved road.

As shown in FIG. 6, the objective beam number is determined from an angular difference between the center direction (corresponding to the center beam number) and the reference direction P (corresponding to the objective beam number). By initiating the process of forming the presegment data from the objective beam number, the preceding vehicle can be surely detected even when the own vehicle 300 is traveling on a curved road 320 along a curved line 330.

How the objective beam number is determined will be explained referring to FIG. 7. When the preceding vehicle is stably detected, the objective beam number No from which the segmentation process is initiated is determined from the center position (X0, Z0) of the preceding vehicle according to the following formula.

$$No=Nc+(X0+\Delta X)\times 180 \div (0.15\times n) \div Z0 \quad (1)$$

Nc is the center beam number, which is 53 because one scanning line in the X-direction consists of 105 beams. 0.15 in the formula (1) represents an angle between two neighboring beams. $\Delta X$ is an offset amount of a mounting position of the detection system 350 relative to the turning center 100 of the vehicle 300, as shown in FIG. 7. The turning center 100 is a point around which the vehicle 300 turns when the vehicle is steered.

It is possible, however, to determine the objective beam number according to the above formula (1) only when the following conditions are satisfied: (a) The preceding vehicle is continuously detected as a moving object for a certain period. (b) A changing rate of a relative speed between the detected object and the vehicle is smaller than a certain level. Stationary objects repeatedly detected (such as roadside poles) may be misjudged as a moving object. Such a misjudgment can be eliminated by applying this condition. (c) The same lane probability (explained later) is higher than a certain level. (d) The vehicle is traveling on a curved road. If the vehicle is traveling on a straight road, it is preferable to initiate the segmentation process at the center beam, not at the objective beam number determined according to the formula (1), in order to secure a wide detection area.

If plural preceding vehicles that satisfy the above conditions are detected, one preceding vehicle that is closest to the own vehicle is selected. The segmentation process is initiated from the beam number corresponding to the center position (X0,Z0) of the selected vehicle.

When the preceding vehicle is not continuously detected, the segmentation process is initiated from the objective beam number determined as follows. A position where the preceding vehicle is most probably located is presumed based on a reference distance in the Z-direction and a calculated radius R of a curved road. The reference distance corresponding to a traveling speed of the vehicle is predetermined, so that the reference distance becomes longer as the vehicle speed becomes higher. This is because a distance between two vehicles is usually set longer as the vehicle speed becomes higher.

Figure 7:
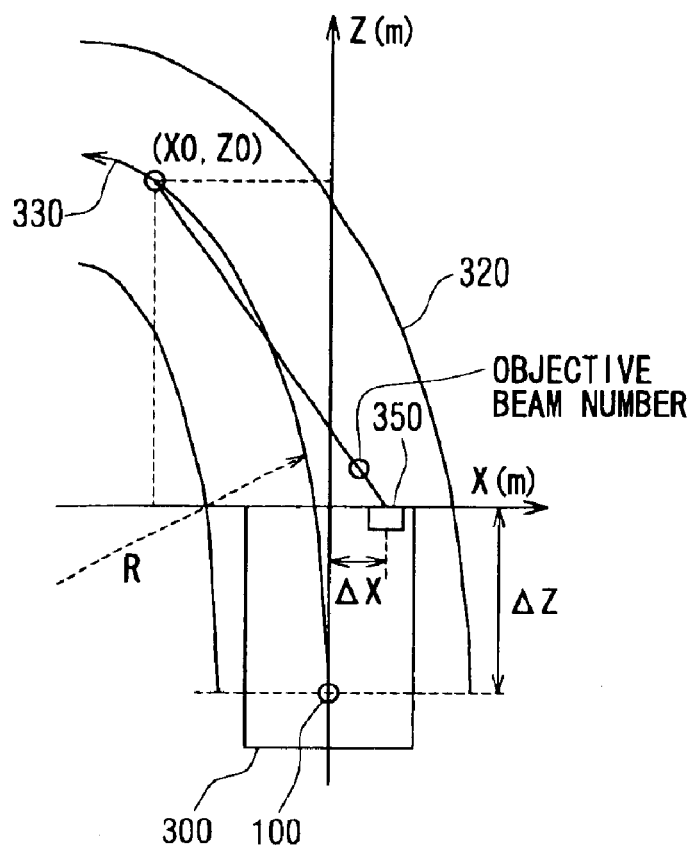
FIG. 7 is a graph showing a method of calculating an objective beam number.

The presumed position (X0,Z0) of the preceding vehicle is expressed according to the following formula by setting the reference distance in the Z-direction to Z0 (refer to FIG. 7).

$$X0=Zr^{2}/2R;\ Zr=Z0+\Delta Z \quad (2)$$

Alternatively, the position X0 in the X-direction can be calculated according to the following formula.

$$X0=(No-Nc)\times Z0\times 0.15\times n \div 180 - \Delta X \quad (3)$$

In the above formulae, No is the objective beam number, Nc is the center beam number and $\Delta X$ is the offset amount of the detection system 350 relative to the center direction, as shown in FIG. 7. From the formulae (2) and (3), the following formula is derived, and the objective beam number No is determined.

$$No=Nc+(Zr^{2}/2R+\Delta X)\times 180 \div (0.15\times n) \div Z \quad (4)$$

Figure 8:
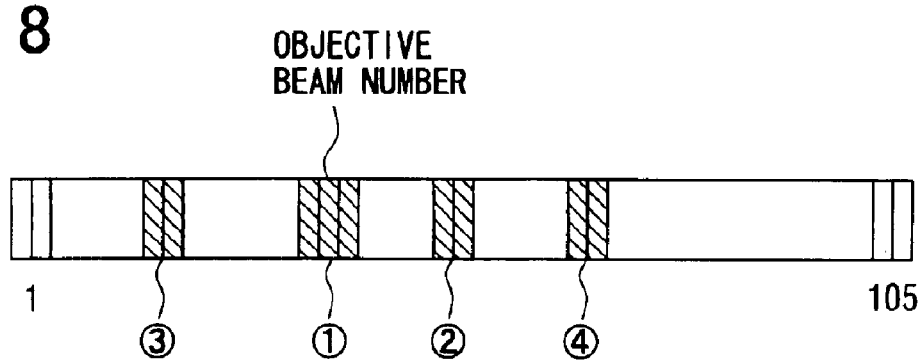
FIG. 8 is a conceptual diagram showing an order of grouping data into presegment data, which is initiated at an objective beam number.

The process of forming the presegment data is initiated from the objective beam number determined as above, and position data are sequentially selected from both sides of the objective beam number to form the presegment data. This process will be explained with reference to FIG. 8. The presegment data ① is formed at the position of the objective beam number, and then the presegment data ② is formed at the right side of the objective beam number by searching the dot data satisfying the grouping conditions. Then, the presegment data ③ is formed at the left side of the objective beam number by searching the dot data satisfying the grouping conditions. After the presegment data ② and ③ are formed at both sides of the objective beam number, a distance of ② from the objective beam number is compared with a distance of ③ from the objective beam number. In this example, the position ② is closer to the objective beam number than the position ③. Therefore, after the presegment data ③ is formed, the next presegment data ④ is searched at the right side of the objective beam (the side of the ② position). After the data ④ is formed, a distance of ③ from the objective beam number and a distance of ④ from the objective beam number are compared. The next data is selected from the side closer to the objective beam number. Similar process is repeated until a predetermined number of dot data is grouped in the presegment data.

In the conventional system, reflecting dots located at one side of the objecting beam number are first picked up for forming the presegment data, and then reflecting dots located at the other side are picked up. If a predetermined number of data to be included in the segment data is picked up from one side of the objective bean number, no other data can be picked up from the other side even if there is a preceding vehicle to be detected. In the system according to the present invention, data close to the objective beam line are surely grouped into the presegment data, because the reflecting dots are picked up alternately from one side and the other side of the objective beam number.

The number of data to be grouped in one presegment data is predetermined for each scanning line. In this particular embodiment, there are six scanning lines as shown in FIG. 3. The predetermined number is set for each scanning line as follows: 12 each for the third line and the fourth line; 8 each for the second line and the fifth line; and 4 each for the first line and the sixth line. The reason for setting these numbers is to save a memory capacity of RAM and to shorten a period of time for data processing. Higher numbers are set for the scanning lines close to the center of the detection area 91, while lower numbers are set for the scanning lines located at the edges of the detection area. This is because, it is highly probable that the obstacles to be detected are at the center portion of the detection area.

Now, the process of forming the main segment data will be described with reference to FIGS. 9A and 9B. When the presegment data of the same scanning line or the neighboring scanning line satisfy the grouping conditions for the main segment data, these data are grouped into a main segment data. In this embodiment, the maximum data number in the main segment is set to 16, and the grouping process proceeds from the first scanning line toward the sixth scanning line until the data number reaches 16. It is also possible to start the grouping process from the scanning lines close to the center of the detection area, e.g., from the third scanning line or the fourth scanning line, which have a higher probability to include necessary information.

Figure 9A:
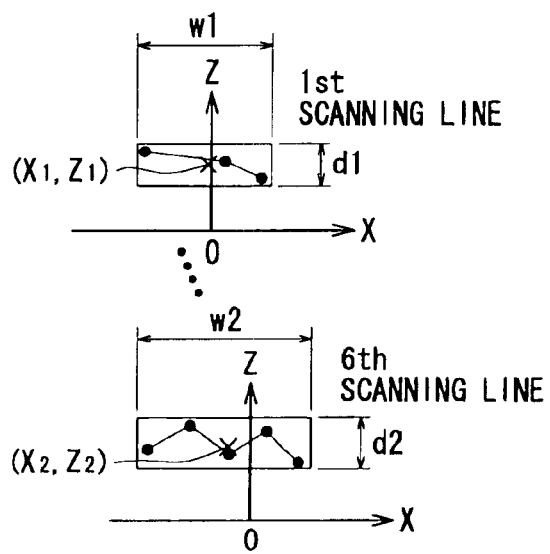
FIGS. 9A and 9B are graphs for explaining a process of forming main segment data from the presegment data.
Figure 9B:
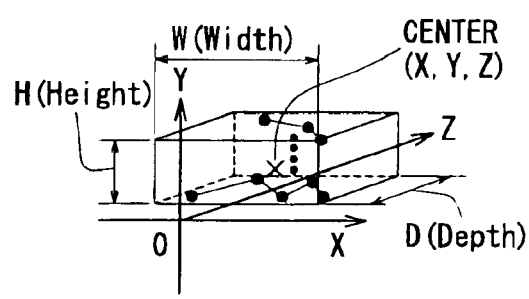

The main presegment data is shown in the orthogonal coordinate having the X, Y and Z-axis (FIG. 9B). The center position of the main segment data is (X, Y, Z). It has width W in the X-direction, depth D in the Z-direction and height H in the Y-direction. All the presegment data that satisfy the grouping conditions for the main segment data are encompassed in the main segment having the size (W, H, D).

As shown in FIG. 9A, the presegment data of the first scanning line has its width w1, depth d1, and its center position is (x1,z1) on the X-Z plane (referred to as the presegment data (w1,d1), (x1,z1)). The presegment data (w1,d1), (x1,z1) is converted to a main segment data (W1, H1,D1), (X1,Y1,Z1). In this conversion, W1 and D1 are the same as w1 and d1, respectively, but H1 is a length in the Y-direction on the X-Y plane corresponding to the scanning angular interval 0.7°. X1 and Z1 are the same as x1 and z1, respectively, but Y1 is a length in the Y-direction on the X-Y plane corresponding to the angle (0.7°×2.5) made by a beam scanning the first line and the Z-axis.

Then, a main segment data (W2,H2,D2), (X2,Y2,Z2) for the second scanning line is formed by combining (or grouping) the main segment data (W1,H1,D1), (X1,Y1,Z1) converted from the presegment data of the first scanning line with the presegment data (w2,d2), (x2,z2) of the second scanning line, if the grouping conditions are satisfied. W2, D2 are set to include both of the area defined by W1, D1 and the area defined by w2, d2 on the X-Z plane. H2 is a length on Y-axis corresponding to the two scanning angle intervals (0.7°×2). X2 and Z2 are calculated as a center of an area defined by W2 and D2, and Y2 is a length on the Y-axis corresponding to an angle (0.7°×2) made by a beam directing a center of the first and the second scanning lines and the Z-axis. The process of forming the main segment data is repeated up to the sixth scanning line.

The grouping conditions for the main segment are as follows: a distance between two data in the X-direction does not exceed 20 cm ($\Delta X \leq 20$ cm), and a distance between two data in the Z-direction does not exceed 5 m ($\Delta Z \leq 5$ m). These two conditions are the same as those for forming the presegment data. In addition to these two conditions, one more condition is set for forming the main segment data. That is, only the data on the same scanning line or the neighboring scanning lines can be grouped into the main segment data. The data that satisfy all of these three conditions are grouped into the main segment data.

Figure 4B:
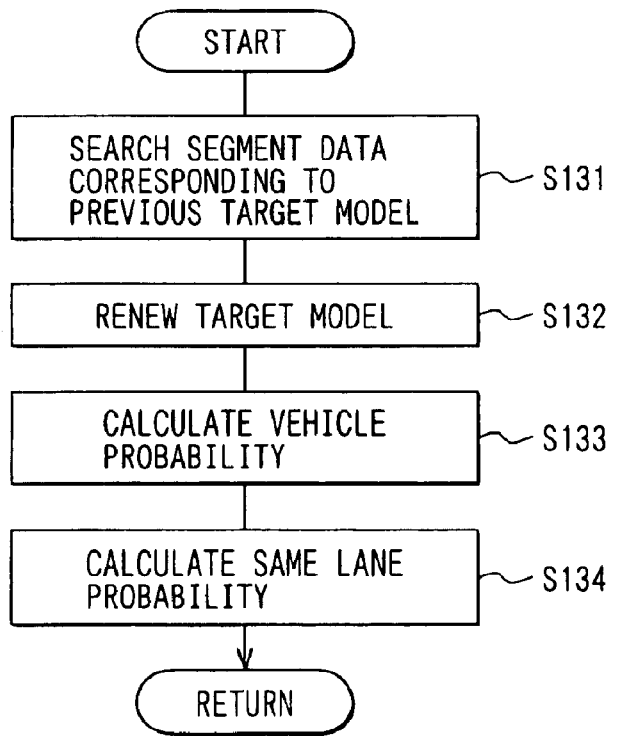
FIG. 4B is a flowchart showing a process of forming a target model.

Now, a process of forming a target model that is performed at step S130 shown in FIG. 4A will be described. Detailed steps of this process are shown in FIG. 4B. At step S131, a main segment data corresponding to a target model that is formulated in the previous detection is searched from among the main segment data formed in the present detection. In this searching process, a presumed target model position is calculated from its previous position, on the assumption that the target model has moved from the previous position at a relative speed which is measured at the previous detection. Then, a certain tolerance range is given to each position in the X, Y and Z directions. The main segment data, at least a portion of which is included in the tolerance range, is determined as the main segment data of the present detection.

If the new main segment data that satisfies the above conditions is found, the previous target model is renewed based on the new main segment data. The renewed target model includes a center position of the main segment data (X,Y,Z), its size (W, H, D), its moving speed (Vx, Vy, Vz) in the X, Y, Z-directions relative to the own vehicle, and data showing the center position obtained at past four detections. If no main segment data that satisfies the above conditions is found, the target model is not renewed, and the previous target model remains unchanged.

At step S133, the vehicle probability, i.e., a probability that the target model represents a preceding vehicle, is calculated based on its relative acceleration, shape, position and detected period. The vehicle probability falls in a range of 0–100%. To eliminate any instantaneous deviation or disturbance due to noises, the vehicle probability is obtained by averaging its plural instantaneous values. The process of calculating the vehicle probability is disclosed in JP-A-2002-40139 in detail. Therefore, it will not be described here in detail.

At step S134, the same lane probability, i.e., a probability that the target model represents a preceding vehicle which is traveling on the same lane as the own vehicle, is calculated in the following manner. The position of the target model is converted to a position on a straight road based on the radius of the curved road calculated in the curve radius calculating circuit 57 (shown in FIG. 1). Then, an instantaneous same lane probability is obtained by overlapping the converted position on a same lane probability map that is predetermined. The same lane probability map shows respective probabilities in sections formed by dividing a frontal area of the own vehicle. For example, a frontal area having 5 m at each side of the vehicle and 100 m in front of the vehicle is divided into plural sections. The same lane probability is given to each section, so that the probability becomes higher as a given section is closer to the own vehicle.

A value of the instantaneous probability calculated as above and its previous value are averaged using a certain weighing factor, thereby obtaining the same lane probability to be fed to the block 53 (shown in FIG. 1). Since the process of calculating the same lane probability is also described in detail also in the above publication, JP-A-2002-40139, no further explanation will be given here.

After the target model is formulated as above, the target model is fed to the preceding vehicle judgment block 53 (shown in FIG. 1) together with the vehicle probability and the same lane probability. The preceding vehicle judgment block 53 determines the target model that has a predetermined vehicle probability (e.g., higher than 50%), a predetermined same lane probability (e.g., higher than 50%) and a distance in the Z-direction closest to the own vehicle as a preceding vehicle. Then, the distance Z between the preceding vehicle and the own vehicle and a relative speed Vz in the Z-direction are fed to the vehicle control and alarm block 55. Thus, an inter-vehicle distance is controlled, and proper alarms are generated based on the distance Z and the relative speed Vz.

The present invention is not limited to the embodiment described above, but it may be variously modified. For example, the polygon mirror 73 having different slant angles used for scanning the two-dimensional detection area 91 may be replaced with a galvano-mirror having a mirror face a slant angle of which is controllable. Though the scan angles θx and θy are converted from the polar coordinates to the orthogonal coordinates in the laser radar sensor 5 in the foregoing embodiment, it is also possible to perform that process in the target model formulation block 43.

Though the detection of the obstacle is performed by emitting the laser beam in the foregoing embodiment, it is also possible to perform the detection using other beams such as electromagnetic millimeter waves or ultrasonic waves, as long as a distance between a frontal obstacle and the own vehicle and an angular direction in which the obstacle is located are detected. When an FMCW radar or a Doppler radar emitting millimeter waves is used, it is not necessary to calculate a relative speed based on the distance data as done in the system using the laser radar, because the speed relative to the preceding vehicle is obtained together with the distance data.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An obstacle detection system mounted on an automotive vehicle, the obstacle detection system comprising:

a radar sensor for detecting a distance from a vehicle to an obstacle located ahead of the vehicle and its angular direction relative to a traveling direction of the vehicle by emitting radar beams and receiving reflected beams from the obstacle;

means for grouping the reflected beams that are recognized as a plurality of reflecting dots representing the obstacle and satisfy predetermined grouping conditions into a target model;

means for detecting the obstacle based on the target model;

a speed sensor for detecting a traveling speed of the vehicle; and means for calculating a radius of a curved road on which the vehicle is traveling, wherein:

the grouping means sets a reference distance according to the detected traveling speed of the vehicle and calculates a reference angle made between a reference angular direction connecting a point set on the curved road, the point being apart from the vehicle by the reference distance, and the traveling direction of the vehicle; and the target model is formed with respect to the reference angular direction by grouping the reflecting dots representing the obstacle.

2. The obstacle detection system as in claim 1, wherein: the reference distance is set longer as the traveling speed of the vehicle becomes higher.

3. The obstacle detection system as in claim 2, wherein: the target model is formed by grouping the predetermined number of reflecting dots, starting from a reflecting dot that is closest to the reference angular direction.

4. The obstacle detection system as in claim 3, wherein: the target model is formed by selecting the reflecting dots sequentially in order of its distance to the reference angular direction until the number of the reflecting dots selected reaches the predetermined number.

5. The obstacle detection system as in claim 3, wherein: the reflecting dot located at one side of and closest to the reference angular direction is first grouped into the target model as a first reflecting dot, and then the reflecting dot located at the other side of and closest to the reference angular direction is grouped into the target model as a second reflecting dot; and a third reflecting dot to be grouped is selected from the reflecting dots located at one side of the reference angular direction where either the first or the second reflecting dot whichever is positioned closer to the reference angular direction is located, and the same process is repeated until the predetermined number of reflecting dots is all selected.

6. An obstacle detection system mounted on an automotive vehicle, the obstacle detection system comprising:

a radar sensor for detecting a distance from a vehicle to an obstacle located ahead of the vehicle and its angular direction relative to a traveling direction of the vehicle by emitting radar beams at a predetermined frequency, the radar beams scanning a predetermined two dimensional detection area ahead of the vehicle, and by receiving reflected beams from the obstacle;

means for grouping the reflected beams that are recognized as a plurality of reflecting dots representing the obstacle and satisfy predetermined grouping conditions into a target model;

means for detecting the obstacle based on the target model;

means for calculating a radius of a curved road on which the vehicle is traveling, wherein:

the grouping means sets a reference angular direction extending from the vehicle to the obstacle that is being observed continuously for a predetermined period of time and selects a predetermined number of reflecting dots to be grouped into the target model from the reflecting dots located closer to the reference angular direction, if the calculated radius of the curved road is smaller than a predetermined value.

7. The obstacle detection system as in claim 6, wherein: the target model is formed by selecting the reflecting dots sequentially in order of its distance to the reference angular direction until the number of the reflecting dots selected reaches the predetermined number.

8. The obstacle detection system as in claim 7, wherein: the reflecting dot located at one side of and closest to the reference angular direction is first grouped into the target model as a first reflecting dot, and then the reflecting dot located at the other side of and closest to the reference angular direction is grouped into the target model as a second reflecting dot; and a third reflecting dot to be grouped is selected from the reflecting dots located at one side of the reference angular direction where either the first or the second reflecting dot whichever is positioned closer to the reference angular direction is located, and the same process is repeated until the predetermined number of reflecting dots is all selected.

9. The obstacle detection system as in claim 6, wherein: if a plurality of obstacles are observed continuously for the predetermined period of time, the grouping means determines one obstacle which is closest to the vehicle and sets the reference angular direction extending from the vehicle to the closest obstacle.

* * * * *